April 1, 1941.    M. IRELAND    2,237,146
THERMAL TIMER FOR AUTOMATIC TOASTERS
Filed June 3, 1939    4 Sheets-Sheet 3

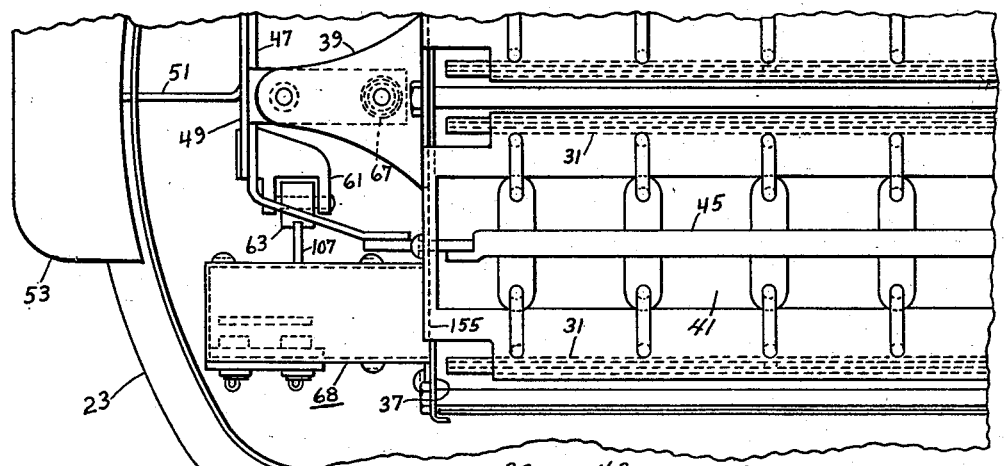
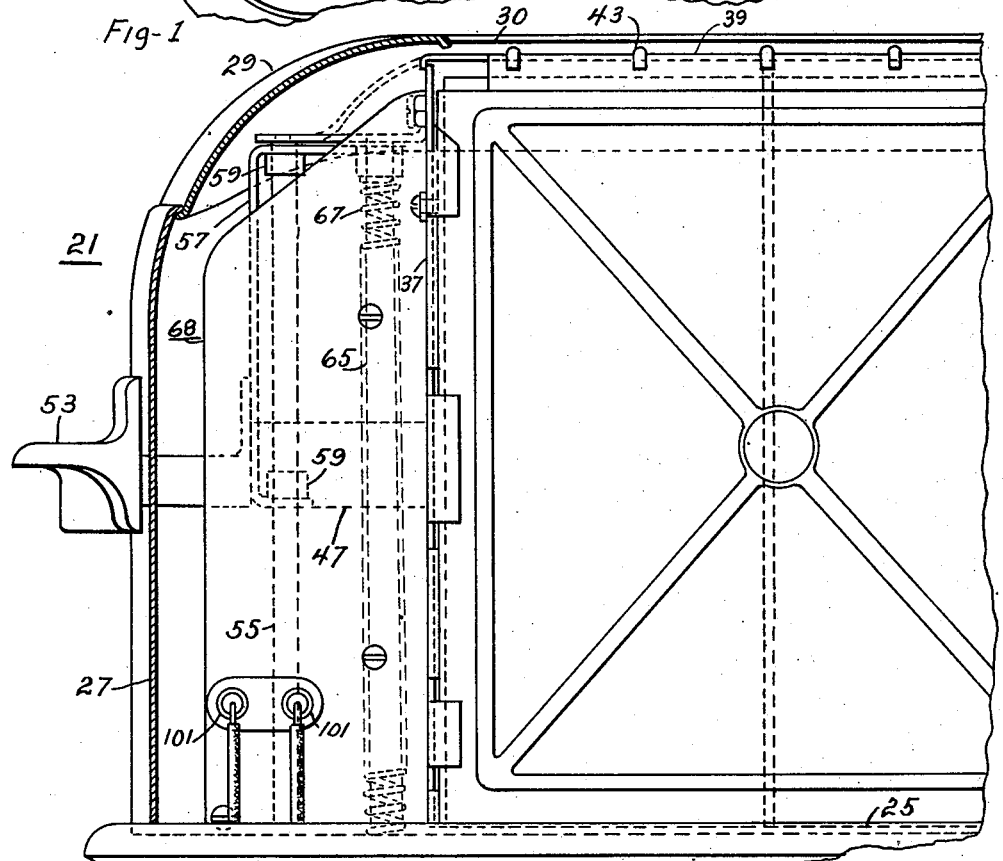

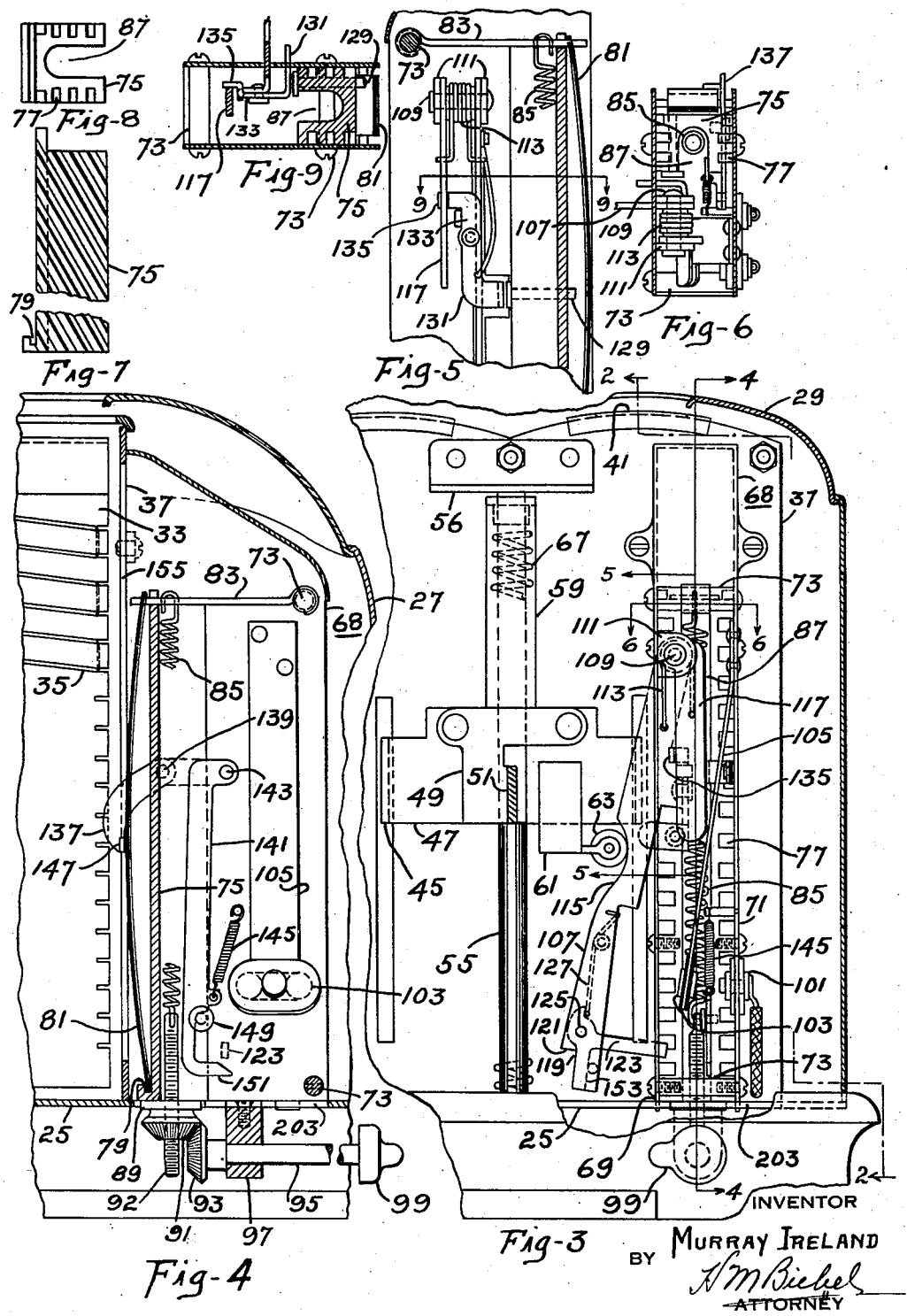

INVENTOR
MURRAY IRELAND
BY
N M Biebel
ATTORNEY

April 1, 1941.   M. IRELAND   2,237,146
THERMAL TIMER FOR AUTOMATIC TOASTERS
Filed June 3, 1939    4 Sheets-Sheet 4

INVENTOR
MURRAY IRELAND
BY  *N. M. Biefield*
ATTORNEY

Patented Apr. 1, 1941

2,237,146

UNITED STATES PATENT OFFICE 2,237,146

THERMAL TIMER FOR AUTOMATIC TOASTERS

Murray Ireland, near Elgin, Ill., assignor to McGraw Electric Company, Chicago, Ill., a corporation of Delaware Application June 3, 1939, Serial No. 277,292

5 Claims. (Cl. 219—19)

This application is a continuation in part of application S. N. 273,074 filed May 11, 1939, which application is being abandoned.

My invention relates to electric cooking devices and particularly to thermal timers for automatic electric toasters.

An object of my invention is to provide an automatic electric toaster comprising a thermal timer for determining the duration of a toasting operation.

Another object of my invention is to provide a unitary thermal timer and detent assembly for easily and quickly mounting on and removal from a toaster.

Another object of my invention is to construct and arrange a thermal timer so that a single thermal element will control the duration of toasting operations to produce uniformly toasted slices of bread in a toaster, irrespective of the temperature conditions of the toaster, the time intervals between successive toasting operations and of the variations in operating conditions of the toaster.

Other objects of my invention will either be apparent from a description of several modifications of a device embodying my invention or will be more specifically pointed out hereinafter, particularly in the appended claims.

While I have illustrated several devices, it is desired that all further obvious modifications coming within the scope of the appended claims shall be considered to be covered thereby.

In the drawings—

Figure 1 is a fragmentary top plan view, with the cover removed, of an electric toaster embodying my invention, Fig. 2 is a fragmentary view in vertical longitudinal section of a toaster embodying my invention, Fig. 3 is a fragmentary view in vertical lateral section therethrough, Fig. 4 is a fragmentary view in vertical longitudinal section taken on the line 4—4 of Fig. 3, Fig. 5 is a fragmentary view in vertical section taken on the line 5—5 of Fig. 3, Fig. 6 is a fragmentary view in horizontal section taken on the line 6—6 of Fig. 3.

Fig. 7 is a fragmentary view in side elevation of a cooling member,

Fig. 8 is a top-plan view of the cooling member,

Fig. 9 is a horizontal sectional view therethrough taken on the line 9—9 of Fig. 5.

Figure 14:
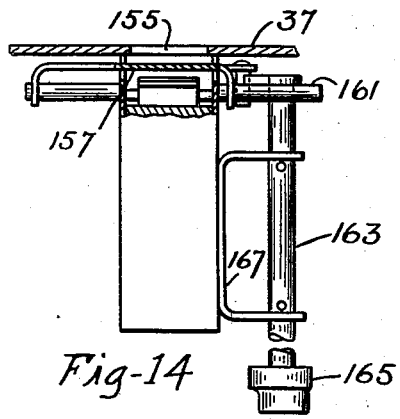
Figure 12:
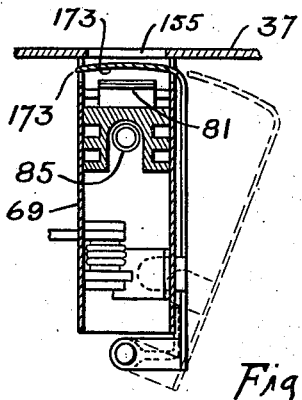
Figure 13:
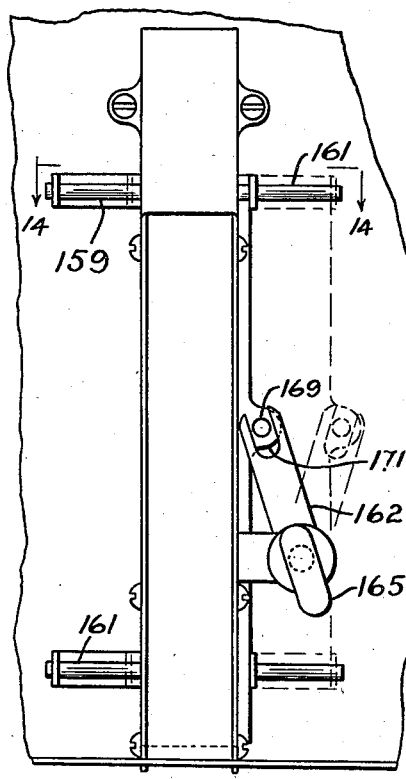
Figures 10, 11:
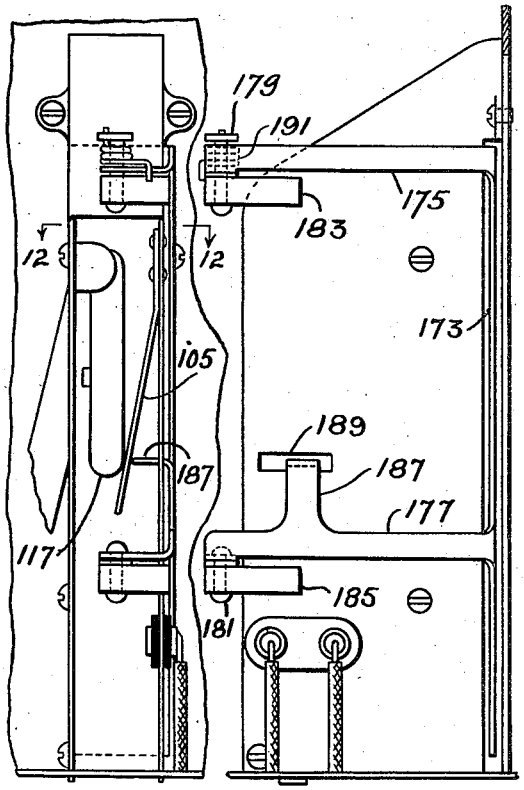
Figure 16:
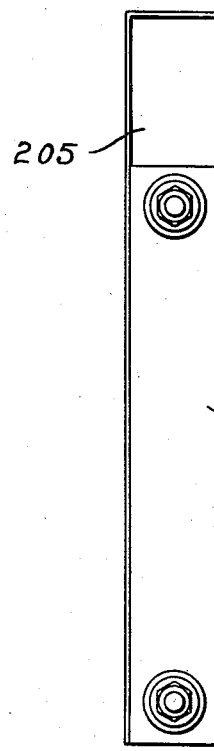
Figure 15:
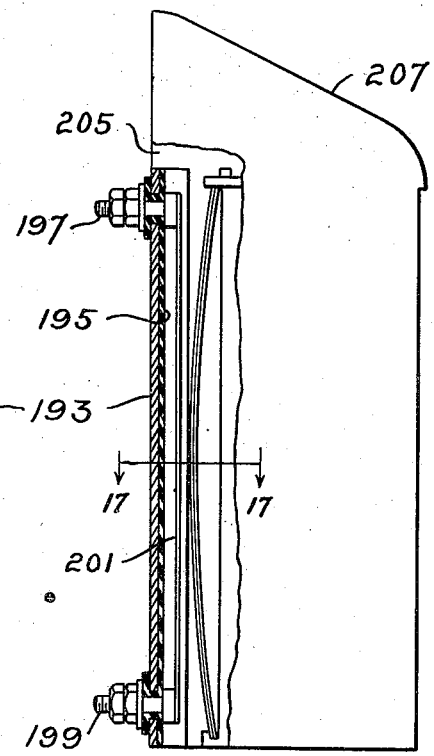

Fig. 10 is a fragmentary view in side elevation showing a modification of my improved timer and detent assembly, Fig. 11 is a view in front elevation thereof, Fig. 12 is a view in horizontal section therethrough taken on the line 12—12 of Fig. 11, Fig. 13 is a view in front elevation showing a manually operable means for varying the amount of heat reaching the thermal timer element, Fig. 14 is a horizontal sectional view therethrough taken on the line 14—14 of Fig. 13, Fig. 15 is a view in side elevation, with parts broken away, of another modification of my timer and detent assembly, Fig. 16 is a view in rear elevation thereof.

Figure 17:
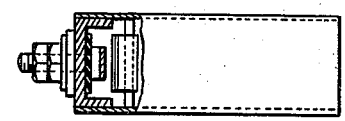
Figure 18:
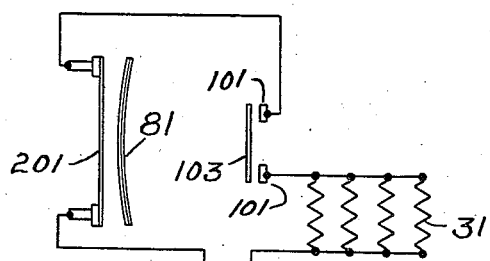

Fig. 17 is a top-plan view thereof with parts thereof shown in section, and,

Fig. 18 is a wiring diagram which I may use with the modified form of the device shown in Figs. 15 to 17 inclusive.

The thermal control of the duration of a toasting operation of an electric toaster and the restoration of the several parts thereof to their inoperative positions may be effected in a number of different ways. One of these methods is that in which a single thermal element constitutes the timing member and in this case it is necessary that the thermal element be restored to a sufficiently low temperature, at substantially the end of a toasting operation, as will properly time the next succeeding operation, taking into consideration that the temperature of the toaster has been increased by a preceding operation.

It is of course obvious that any toaster will experience a rise of temperature in its various component parts when it is operated a number of times in relatively quick succession. This increase in the temperature of the toaster chamber structure, or of the entire toaster assembly, has the result that the duration of a toasting operation is reduced with quickly succeeding toasting operations all in a manner now well understood.

When a single thermally actuable element is used to determine the duration of a toasting operation, it may be so arranged and operated that it will pass through a heat-up cool-off cycle during each toasting operation. A modification of this method is that in which a single thermal element operating as a timer, operates to determine a toasting operation when it has been heated to a predetermined high temperature, and is then quickly cooled within a very short time, which time is usually on the order of the length of time required by an operator to remove the toasted slices of bread and to insert fresh slices of bread. This cooling of the thermal element may be effected by making the thermal element a snap-acting bimetal bar normally bowed in one direction and moving suddenly in the opposite direction and against the relatively cool surface of a metallic cooling member. Both the bimetallic bar and the cooling member may be subjected to a through draft of cooling air, the cooling member and the bimetal bar being preferably positioned in a chamber apart from the toasting chamber of the toaster but subject to a cooling draft of air caused by the main electric heaters in the toasting chamber. The design, construction and arrangement of the thermal timer is such that no compensating member is required.

Referring now to Figs. 1 to 4 inclusive of the drawings, I have there illustrated a toaster assembly 21 which may be of any suitable or desired type and is here shown as comprising a skeleton frame 23 of a moulded composition material having a base plate 25 of metal thereon upon which there is supported a casing 27 comprising front, rear and side walls and a suitable cover member 29, all of which are now well known in the art. The cover 29 has slots 30 therein for the insertion and removal of slices of bread.

I provide also a plurality of pairs of electric heating elements 31, also now well known in the art, and which may comprise vertically extending sheets of electric insulating material 33 having a resistor strip of wire 35 wound thereon. I provide a pair of such spaced planar heating elements for each slice of bread adapted to be toasted simultaneously in such a toaster. While I have shown and described a toaster adapted to operate on two slices of bread, I do not desire to be limited thereto.

A toasting chamber is constituted by a front intermediate wall 37 and a rear intermediate wall which is not shown in the drawings but which is of substantially the same kind as is described in Ireland Pat. #2,001,362 in combination with the two outermost electric heating elements 31. The bottom and top walls of such a toasting chamber may be constituted by the base plate 25 and by the cover 29, or its equivalent.

A top frame plate 39, or a plurality thereof, may be provided, each such plate extending longitudinally of the toaster and having a slot 41 therein (see Fig. 3) through which slices of bread may be inserted and removed from the toasting chamber. A plurality of depending guard and guide wires 43 are supported by the respective top frame plates 39, all in a manner well known in the art.

Bread carriers 45 extending longitudinally of the toaster between each pair of heating elements permit of supporting slices of bread while being toasted and are vertically movable upwardly and downwardly in the toasting chamber. When they are in their uppermost position, as shown for instance in Fig. 3 of the drawings, they are considered to be in their non-toasting position from which they may be moved downwardly into a lower, toasting position. The forward ends of the bread carriers may be connected to a cross member 47 (see Fig. 3) which cross member may have loosely secured thereto a bracket 49 having a portion 51 projecting outwardly through a slot in the front wall of the casing and which may have an actuating knob 53 mounted thereon, all in a manner well known in the art.

A vertical standard 55 may have its lower end fitting in and supported by the base plate 25 while its upper end may be supported by a part of frame plate 39. The cross bar 47 has secured thereto or as an integral part thereof a slider 57 having tubular bearings 59 thereon engaging the standard 55. The member 47 may have an extension 61 mounted thereon which is provided, as shown particularly in Figs. 1 and 3 of the drawings, with a roller 63 for a purpose to be hereinafter set forth.

Means for biasing the bread carriers 45 to their upper or non-toasting position may comprise a second vertical standard 65 on and around which may be located a compression coil spring 67, the upper part of slider 57 extending backwardly (as seen in Fig. 2) to engage the upper end of spring 67. It is to be understood that these details are illustrative only and show details which I may use to obtain the desired result and any set of elements operative for the same purpose may be utilized by me.

A mechanism chamber is constituted by the front wall of casing 27 and the front intermediate wall 37 and in this chamber I locate a thermal timer and detent assembly 68 now to be described. This timer includes two side plates 69 and 71 generally of rectangular shape. These plates may be spaced apart by suitable spacer rods 73.

Between the plates 69 and 71 there is located a cooling member 75 of generally rectangular shape and having a cross section such as is shown in Fig. 9 of the drawings, that is, the member is of generally channel shape in lateral section. Its two sides may be provided with recesses 77 extending in a generally upwardly direction at an acute angle relatively to a vertical line, as shown in several of the figures of the drawings in order to increase its heat radiating surface whereby to maintain it at a relatively low temperature during operation of the toaster. At its lower end the member 75 is provided with a lateral recess 79 (see particularly Fig. 7) in which one end of a bimetal timer bar 81 is adapted to fit. The design and construction of the recess 79 is such as to provide a knife-edge bearing for one end of the thermal timer member 81. The upper end of the bar 81 engages the outer end of a pivotally mounted bar 83 which may have its other end bent around one of the spacer rods 73 as shown in Figs. 4 and 5 of the drawings. A coil spring 85 has one end connected with the arm 83, extends in the longitudinal recess 87 of member 75, and has its other end connected to a threaded stud 92 which extends through a washer 89 held against the lower end of member 75 by a bevel gear nut 91. The stud 92 can not turn relatively to washer 89. A second bevel gear 93 meshes with bevel gear 91, this second gear being mounted on a shaft 95 rotatable in a suitable bearing block 97, a knob 99 being mounted on the shaft 95 outside of the casing to permit of varying the position of bevel gear nut 91 on stud 92 whereby to vary the tension applied to the normally bowed bimetal bar 81. As is well known, the greater the tension applied to spring 85, the greater will be the compression on bar 81 and consequently the greater will be the temperature variation thereof before it will move from its initial bowed position to an oppositely bowed position. It is of course understood that the bimetal bar 81 consists of two components having different coefficients of thermal expansion and that this bar is so positioned that it will tend to move to a condition of opposite curvature with increase of temperature of the bowed bimetal bar.

A control switch for controlling the energization of the main electric heaters 31 may include a pair of spaced contact members 101 insulatedly mounted near the lower end and inside of plate 71 of the timer and detent assembly. A movable contact may include a contact bridging member 103 which is insulatedly mounted on a spring bar 105 which is secured to the inside of plate 71 near its upper end, this spring bar being so bent as to normally occupy the position shown in Fig. 3 of the drawings where the contact bridging member 103 is out of engagement with the contact members 101.

A compound detent lever and actuating arm 107 is pivotally mounted on a pin 109 supported near the top of plate 69 by a bracket member 111 (see particularly Fig. 3). A biasing spring 113 normally biases lever arm 107 in a clockwise direction, this turning movement being limited by engagement of an intermediate part of arm 107, such as the recessed intermediate part 115, with roller 63 on member 47. It is obvious that when the bread carriers are moved downwardly by pressure on knob 53 the roller 63 will move along the left-hand edge of arm 107 and cause it to move in a counter-clockwise direction.

An arm 117 is pivotally mounted on pin 109 and its free end engages spring bar 105. When the bread carriers are moved downwardly, roller 63 moving along the left-hand edge of arm 107 and causing turning movement thereof in a counter-clockwise direction, will also cause a turning movement of arm 117 in a counter-clockwise direction and thereby cause closing movement of contact bridging member 103 relatively to contacts 101, that is, the circuit through the heating elements will be energized when the bread carriers have been moved to their lower or toasting positions.

The lower end of arm 107 is provided with a recess 119 constituting a shoulder 121, the roller 63 being adapted to be moved under the shoulder 121 to be held thereby for a certain length of time until released by means presently to be described. The outer diameter of roller 63 is made such, relatively to the depth of recess 119 and the width of shoulder 121, that it will be securely held under the shoulder as long as desired but can be easily released therefrom. This release means includes a bell crank lever 123 pivotally mounted at 125 on the lower end of arm 107, this bell crank lever being biased to substantially the position shown in Fig. 3 of the drawings by a small spring 127.

A pin 129 is mounted in member 75 (see Figs. 3 and 5) for movement longitudinally of its length and extends through the rear edge of member 75 where it may be engaged by bimetal bar 81 when the same snaps over into its other position substantially opposite to that shown in Figs. 4 and 5 of the drawings. This pin 129 then engages one arm 131 of a double arm pivotally mounted lever, the other arm 133 of which has an off-set portion 135 which is normally in engagement with arm 117 whereby turning movement of the main arm 107 in a counter-clockwise direction causes movement of arm 117 as hereinbefore described. When, however, pin 129 is moved as has just above been described, by bimetal bar 81, the lateral portion 135 of the double arm lever is moved out of engagement with arm 117 whereby the biased spring bar 105 may move to the position shown in Fig. 3 of the drawings, that is the circuit through the main heating elements is interrupted.

Means for effecting release of the roller 63 from the detent lever arm 107 includes a bell crank lever having an arm 137 pivotally mounted at 139 on cooling member 75, intermediate the ends of arm 137. A depending arm 141, the outline of which is shown in Fig. 4 of the drawings, has its upper laterally projecting end portion connected to the inside end of lever arm 137 by a pin 143. A small coil spring 145 (see Fig. 4) biases arm 141 upwardly and therefore biases bell crank lever 137 in a counter-clockwise direction until a projection 147 thereon engages the bowed bimetal element 81 as is shown particularly in Fig. 4 of the drawings. The lower end of arm 141 is guided by a headed pin 149, the spring 145 tending to draw the lower end of arm 141 against this pin.

When the bimetal bar 81 moves from the position shown in Fig. 4 of the drawings to a position shown by the broken lines in Fig. 4 the spring 145 will cause a movement of arm 141 in an upwardly direction because of the follow-up movement of projection 147 of bell crank lever 137 and the beveled lower end 151 of arm 141, past the arm 123 hereinbefore described and come to a stop just above said arm 123. On cooling of the bimetal bar because of its engagement with the cooling member 75 the bimetal bar 81 will again move to the position shown in full lines in Fig. 4 of the drawings causing a turning movement in a clockwire direction of bell crank lever 137, downward movement of arm 141 and a downward movement of end 151 of arm 141 with consequent engagement therewith of arm 123 and movement thereof in a clockwise direction. The lower arm 153 of bell crank lever 123 is thereby moved in a clockwise direction to cause turning movement of arm 107 in a counter-clockwise direction, to an extent sufficient to disengage it from roller 63. The bread carriers and associated parts will therefore be permitted to move upwardly because of the action of the biasing spring 67 thereon.

It is desired that the bimetal element 81 be heated substantially in proportion to the heating of a slice or slices of bread being toasted and in Figs. 1 to 9 inclusive of the drawings I have illustrated a design and construction in which the bimetal bar 81 is subjected to direct radiant heat from the main heating elements 31. This is effected by providing a vertical slot 155 in front intermediate wall 37 in such position as to substantially register with bimetal bar 81, which, as may be seen from Fig. 1 of the drawings, is at the right-hand side of front intermediate plate 37, as viewed from the front of the toaster.

Means for varying the amount of radiant heat impinging on bimetal bar 81 may comprise a shutter 157 (see Fig. 14) movable on horizontally extending rods 159 and 161 which rods may be a part of or be mounted on the timer assembly hereinbefore described. This shutter 157 may be manually adjusted by means of a pivotally mounted lever arm 162 which has one end mounted on a shaft 163 adjustable by a knob 165, this shaft being supported by a bracket 167 mounted against one of the plates, as for instance against plate 71. The movable end of rod 161 is slotted as shown in Fig. 13 and engages a pin 169 secured in a lug 171 constituting a part of shutter 157. While I have shown and described a particular construction of manually operable shutter, I do not desire to be limited thereto since any structures operative for the same purpose may be utilized.

I may also desire to suddenly terminate the application of radiant heat from the toasting chamber, the toasting chamber structure and from the heating elements substantially simultaneously with the deenergization of the heating elements and for this purpose I may use an automatically controlled shutter as is shown in Figs. 10, 11 and 12 of the drawings. For this purpose I provide a shutter 173 which may be provided with two horizontally extending arms 175 and 177 (see Fig. 10) which may be pivotally mounted on pivot pins 179 and 181. These pivot pins may be supported in any suitable or desired manner here shown as brackets 183 and 185.

The lower arm 177 is provided with an upwardly and inwardly extending lug 187, the extreme end portion of which extends into and moves in a slot 189 in outer plate 71. The inner end of arm 187 is positioned at one side of spring bar 105, substantially as shown in Fig. 11 of the drawings, so that when arm 117 is moved in a counter-clockwise direction as seen in Fig. 11 and spring bar 105 is also moved in a counter-clockwise direction, arm 187 is moved to the right as seen in Fig. 11 whereby shutter 173 is caused to be moved into the position shown in broken lines in Fig. 12 of the drawings, that is, the entire width of slot 155 in front intermediate wall 37 is opened for radiant heat to pass therethrough and impinge on bimetal bar 81.

From what has heretofore been set forth in connection with the movement of arm 117 in a clockwise direction when the bimetal bar 81 has moved into cooling engagement with member 85, the shutter 173 will be permitted to return to its position shown by the full lines in Fig. 12 of the drawings, when the bimetal bar has operated to cause opening of the heater control switch, the shutter being biased to this position by a small coil spring 191 on pin 179. I am thus enabled to reduce the amount of heat reaching the bimetal bar during its cooling period whereby it may be cooled to a still greater degree or with a greater speed.

It is not necessary that the main heating elements be utilized to thermally energize the bimetal element 81 and Figs. 15 to 18 inclusive show a modification of the timer and detent assembly 68 hereinbefore described in which an auxiliary heating element is utilized. For this purpose the timer and detent assembly may be provided with a rear wall 193 on the outer side of which a strip of electric insulating material 195, such as mica, may be secured and on which be insulatedly secured spaced contact terminals 197 and 199, to the inner ends of which a resistor 201 may be secured. The auxiliary resistor 201 may be connected in series circuit relation with the main heating elements 31 as is shown more particularly in Fig. 18 of the drawings so that the main control switch comprising the fixed contacts 101 and the contact bridging member 103 will control the energization of the auxiliary as well as of the main heating element. It is thus evident that the auxiliary electric heater 201 will be energized during the same length of time that the main toasting heaters 103 are energized. In all other respects this modification is substantially the same as hereinbefore described.

As it is desirable to provide efficient cooling for the cooling member 85 I prefer to make the bottom of the timer and detent assembly structure open and to position it above an opening 203 in base plate 25 to permit of a through draft of cool air to enter the mechanism chamber through bottom plate 25, pass through the relatively open timer assembly in its casing and then flow into the toasting chamber at the upper end thereof through the slot 155 and outwardly therefrom. When using the assembly shown in Figs. 15 to 17 inclusive the rear wall 193 of the timer assembly is made shorter than the over-all length of the assembly to provide an opening 205 therein and in order to accentuate the draft effect, an angularly inclined cover 207 may be located above the timer structure. It is of course obvious that the draft sweeping continuously through the timer assembly entering at the bottom of the toaster and flowing at least partially through the toasting chamber, is created by the main heating elements and that therefore this draft will be a relatively strong one, assuming a reasonable unobstructed path therefor.

One of the very desirable characteristics of an automatic electric toaster of the kind herein disclosed is that it shall make substantially uniform toast, of the desired degree, irrespective of whether the operation is the initial one, that is starting with a cold toaster at substantially room temperature, or whether it is at any successive toasting operation, when the temperature of the parts of the toaster structure will be higher than that obtaining at the beginning of or during the first toasting operation. Further, the degree of toasting should be uniform irrespective of the lengths of time elapsing between successive toasting operations. Further, the degree of toasting should be uniform irrespective of variations in the voltage of the supply circuit. It is of course to be understood that the operations just above described relate more particularly to toasting the same kind of bread, that is, bread of the same texture and of the same age, which latter condition greatly affects its moisture content.

The device embodying my invention, in either of the forms shown in the drawings, meets this desired characteristic to a high degree with the use of only a single thermally actuable timer element because of the fact that the unitary timer structure herein disclosed and claimed is so designed, constructed, positioned and correlated with the toaster structure itself and the operation thereof that it will operate in the desired, above described manner.

It is obvious that if we desire to obtain uniform toasting of successive slices of bread, it should be possible to do so without any adjustment of the various parts of the toaster and of the timer which means, particularly, that no adjustment shall be made or shall be necessary in the setting of the thermal timer element, in this particular case a bimetal element. This means that the bimetal element will operate from its initial position in which it is bowed in one direction to its oppositely bowed position, at a given temperature. It is already well known that the degree of toasting is substantially proportional to the temperature of the surface or surfaces of a slice of bread being toasted. This then means that if the two surfaces of a slice of bread (where both sides of a slice of bread are toasted simultaneously) are heated to a predetermined temperature, to give the desired degree of color, the thermal control element should also be heated to a given temperature at which it will operate in the manner already hereinbefore set forth.

It is further obvious that a longer time will be required to cause rise of temperature of the surfaces of a slice of bread being toasted in the first toasting operation starting with a cold toaster, than will be required for successive slices of bread particularly where only a relatively small time interval elapses between such successive toasting operations. This is because of the fact that some of the heat from the toast-heating elements causes rise of temperature of the toaster structure as a whole. After a stable condition has been reached, which usually occurs after say five to ten quickly succeeding toasting operations, no further heat is stored in the toaster structure but only a substantially constant amount of heat is radiated from the outer surface thereof and a substantially constant amount of heat is dissipated by through currents of air such as have already been hereinbefore referred to, but since these amounts are substantially constant they will not tend to vary the duration of a toasting operation.

It is, therefore, an essential consideration in the design of a thermally controlled toaster of this kind that the thermal element be heated to its operating temperature in substantially and preferably in exactly the same length of time as is required to raise the temperature of the surfaces of a slice of bread (and of course of at least the outer portion of the thickness of a slice of bread being toasted) to the desired or predetermined temperature at which the desired degree of toasting will have been effected. This is accomplished in my improved design as set forth in the present application by so designing, constructing, positioning, and arranging the various parts of the thermal timer in its correlation with the toaster structure that the temperature rise thereof shall be substantially similar to but not necessarily to the same value as that of the surface of a slice of bread being toasted. When such proper correlation of rate of temperature rise irrespective of the temperature conditions of the toaster or of any and all extraneous relevant conditions exists, it is obvious that the control elements will operate to cause termination of the toasting operation at the proper moment to obtain substantially uniformly toasted slices of bread in a given toaster, irrespective of temperature conditions of the toaster structure or of the voltage of the supply circuit or any other factors which may affect operation of the toaster.

However, this is not sufficient since a toaster of this kind may be operated with widely varying time intervals between successive toasting operations. Thus a toaster may be operated two or three times in quick succession or it may be operated with time intervals of several minutes or of five or ten minutes depending upon the calls for freshly toasted slices of bread. It is therefore necessary to insure that the temperature conditions of the thermal timer on cooling shall be such as will correspond to the temperature conditions of the toaster structure on cooling, at any time when a new toasting operation is initiated, irrespective of whether this toasting operation succeeds a preceding toasting operation with a time interval of only a few seconds which may be required to remove the toasted slices of bread, insert fresh slices of bread and then initiate the toasting operation, or whether five minutes or a much longer time interval has elapsed since the termination of the next preceding operation.

I have found that the design, construction and location of the thermal timer hereinbefore described, are such that such correspondence of temperature conditions between the timing device and the toaster exists and one of the essential elements in obtaining this correspondence is, in my opinion, because of the fact that the bimetal element and its correlated parts constituting the timer are subject to a through draft of cooling air as has already been hereinbefore set forth.

I have used the phrase "corresponding temperature values" since I do not wish to be understood as saying that it is necessary to make the operating temperature, as hereinbefore defined, the same as that of the surfaces of a slice of bread being toasted. Thus, if the operating temperature of the thermal timing element is less than that of the surfaces of a slice of bread being toasted, the thermal element will be less sensitive than would be the case if the operating temperature of the thermal element were higher than that of the surfaces of the slice of bread when it has been toasted to the desired degree.

The desired operation set forth hereinbefore is obtained in a very easy manner in that modification of the device in which the snap-acting bimetal bar is subject to direct radiant heat from the main or toasting elements. In this connection I wish to point out that the amount of heat received by the bimetal element by radiation from the resistor wire may be varied in a very simple manner by use of the manually adjustable shutter hereinbefore described. However, the thermal timer embodying my invention is not limited to being heated by high temperature radiant heat received directly from the toasting elements but I have found it possible to obtain substantially equally goods results by the structure shown in Figs. 15 to 18 in which an auxiliary heater, in series with the main heaters, is used to thermally energize the bimetal element. Even though the thermal timing element be heated by an auxiliary heater, it is to be noted that it is still subject to some heat received from the main toasting elements since they will thermally affect the intermediate wall positioned between the main toasting elements and the main thermal timing device. It is only necessary to give proper consideration to the amount of heat which may reach the main thermal timing element from the main toasting elements in the design, construction, arrangement and adjustment of the thermal timing device. Tests on a thermal timing device of the kind shown in the drawings where the bimetal element was subject to direct radiant heat from the main heaters showed that it was possible to obtain substantially uniform degree of toasting of successive slices of bread under all ordinary operating conditions.

I claim as my invention:

1. In combination with an automatic electric toaster comprising a toast heating means, a bread carrier movable into toasting and non-toasting positions relatively to said toast heating means and yieldingly biased to non-toasting position, means for moving said bread carrier to toasting position to initiate a toasting operation and means to terminate a toasting operation, said means comprising a unitary assembly including a control switch for the toast heating means normally yieldingly biased to open position, detent means including a main detent operatively engageable by said bread carrier when it is being moved into toasting position and effective to hold the bread carrier in toasting position, a second detent on said main detent for moving said switch into closed position during movement of the bread carrier to toasting position and for holding the switch in closed position, a bimetal bar, means for heating and then rapidly cooling said bimetal bar to cause a portion thereof to move in one and then in the reverse direction, movement of the bimetal member in said one direction causing release movement of the second detent and opening of said control switch and means actuable by said bimetal when moving in the reverse direction for effecting release of the carrier from said main detent.

2. In combination with an automatic electric toaster comprising a toast heating means, a bread carrier movable into toasting and non-toasting positions relatively to said toast heating means and yieldingly biased to non-toasting position, means for moving said bread carrier to toasting position to initiate a toasting operation and means to terminate a toasting operation, said terminating means comprising a unitary assembly, a main detent lever arm operatively engageable by the carrier when moved into toasting position to hold the carrier in toasting position, an auxiliary lever arm, a common pivotal support for said lever arms, an auxiliary detent on said main detent lever arm controlling said auxiliary lever arm, a control switch for the toast heating means normally yieldingly biased to open position and moved into and held in closed position by said auxiliary lever arm when the bread carrier is moved into toasting position, a bimetal bar, means for heating and cooling said bimetal bar and movement of a part thereof in one direction and then in the reverse direction, means actuable by the bimetal bar when it has been heated to a predetermined temperature to cause release movement of the auxiliary detent and opening of the switch, and means actuable by the bimetal bar when moving in the reverse direction for effecting disengagement of the bread carrier from the main detent lever arm.

3. In combination with an automatic electric toaster comprising an outer casing, toast heating means therein, a front intermediate wall in the casing cooperating with a part of the toast heating means to constitute a mechanism chamber, a bread carrier in the toasting chamber reciprocally vertically movable into toasting and non-toasting positions relatively to the toast heating means and normally yieldingly biased to non-toasting position and means to move the bread carrier to toasting position, a unitary assembly positioned in said mechanism chamber including a detent means for holding the bread carrier in toasting position, a control switch for the toast heating means normally yieldingly biased to open position and movable to and holdable in closed position by said detent means, a substantially vertically-extending snap-acting bimetal timer and detent release member heated by the toast heating means substantially in proportion to the heating of a slice of bread thereby, a shield normally yieldingly positioned between the bimetal member and the toast heating means, means connected with the shield and actuable by the control switch for causing movement of the shield away from its normal position when the control switch is moved into closed position to cause the bimetal member to be directly subjected to heat from the toast heating means, said bimetal member being effective when heated to a predetermined temperature to move in one direction and cause opening of the control switch and then cooling and moving into the reverse direction when cooled to a predetermined temperature and causing movement of the bread carrier out of engagement with the detent means.

4. In combination with an automatic electric toaster comprising a toast heating means, a bread carrier reciprocally movable into toasting and non-toasting positions relatively to the toast heating means and yieldingly biased to non-toasting position and means for moving the bread carrier into toasting position, of a unitary thermal timer, detent and detent release assembly comprising a main detent lever arm for holding the bread carrier in toasting position, a control switch for said toast heating means normally yieldingly biased to open position, an auxiliary detent mounted on, carried by and body movable with the main detent lever arm and effective to cause closing movement of the control switch when the bread carrier is moved into toasting position and a bimetal timer and detent release element subject to direct radiant heat from the toast heating means and effective when heated to a predetermined temperature to move in one direction and actuate said auxiliary detent to cause opening of the control switch, said bimetal element then cooling, moving in the reverse direction and causing movement of the bread carrier out of engagement with the main detent lever arm and return of the bread carrier into non-toasting position.

5. In combination with an automatic electric toaster including a toasting chamber, a toast heating means therein, a bread carrier reciprocally movable in the toasting chamber into toasting and non-toasting positions relatively to the toast heating means and yieldingly biased to non-toasting position and means for moving the bread carrier into toasting position, of a unitary timer, detent and detent release assembly comprising a detent means engageable by the bread carrier to be held in toasting position, a control switch for said toast heating means normally yieldingly biased to open position and movable into and holdable in closed position by said detent means, a bimetal timer and detent release element positioned to be subjected to direct radiant heat from the toast heating means and from the toasting chamber, a shield normally yieldingly biased to a position between the toast heating means, the toasting chamber and the bimetal element, means operatively connecting the shield and the control switch for causing movement of the shield out of its normal position when the switch is moved into closed position, said bimetal element being effective when heated to a predetermined temperature to move in one direction and cause opening of the control switch and return movement of the shield into its normal position, then cooling and moving in the reverse direction and causing release movement of the carrier from the detent means and return of the carrier to non-toasting position.

MURRAY IRELAND.